United States Patent [19]

Dotson

[11] Patent Number: 5,104,304

[45] Date of Patent: * Apr. 14, 1992

[54] GLASS REPAIR APPARATUS

[76] Inventor: Jimmy R. Dotson, 1322 Jackson St., Corinth, Miss. 38834

[ * ] Notice: The portion of the term of this patent subsequent to Sep. 4, 2007 has been disclaimed.

[21] Appl. No.: 542,979

[22] Filed: Jun. 25, 1990

[51] Int. Cl.⁵ .............................................. B32B 35/00
[52] U.S. Cl. ................................. 425/12; 156/94; 264/36; 425/13
[58] Field of Search ........................... 425/11-13; 156/94; 264/36

[56] References Cited

U.S. PATENT DOCUMENTS

| | | | |
|---|---|---|---|
| 3,993,520 | 11/1976 | Werner et al. | 425/13 |
| 4,385,879 | 5/1983 | Wilkinson | 425/13 |
| 4,681,520 | 7/1987 | Birkhauser, III | 425/13 |
| 4,744,841 | 5/1988 | Thomas | 425/13 |
| 4,814,185 | 3/1989 | Jones | 425/13 |
| 4,820,148 | 4/1989 | Anderson | 425/12 |
| 4,919,602 | 4/1990 | Janszen | 156/94 |
| 4,921,411 | 5/1990 | Ottenheimer | 425/13 |
| 4,954,300 | 10/1990 | Dotson | 156/94 |
| 4,975,037 | 12/1990 | Freiheit | 425/13 |

Primary Examiner—Michael W. Ball
Assistant Examiner—Daniel J. Stemmer
Attorney, Agent, or Firm—John E. Vandigriff

[57] ABSTRACT

An apparatus and method for repairing cracks and chips in automobile windshields provides two or more injectors mounted on a bridge element that heats repair chemical prior to inserting the repair chemical into at least two holes or chips in the windshield and a crack between the two chips, and also heats the windshield prior to inserting the repair chemical into the chips and crack.

4 Claims, 3 Drawing Sheets

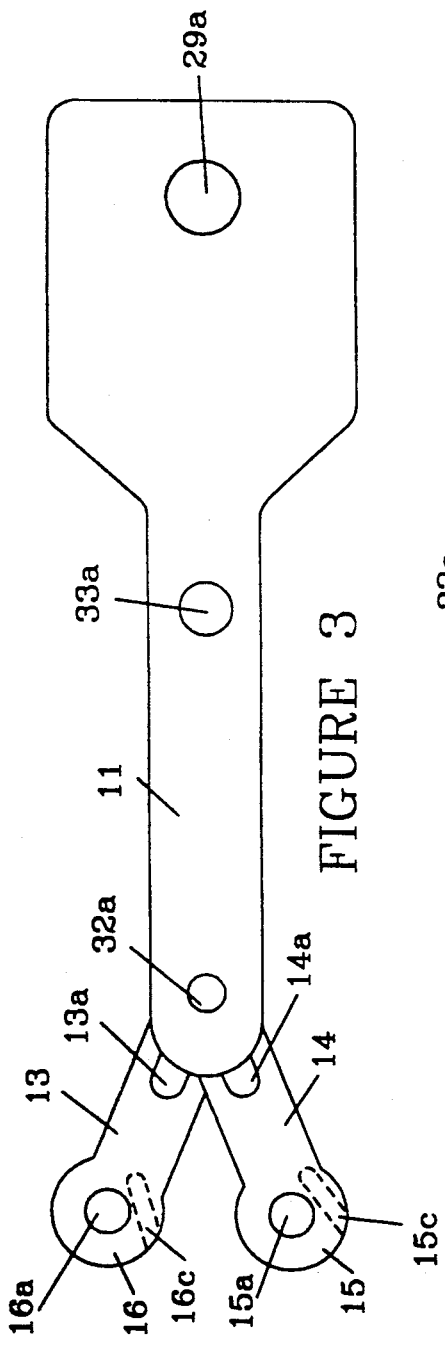
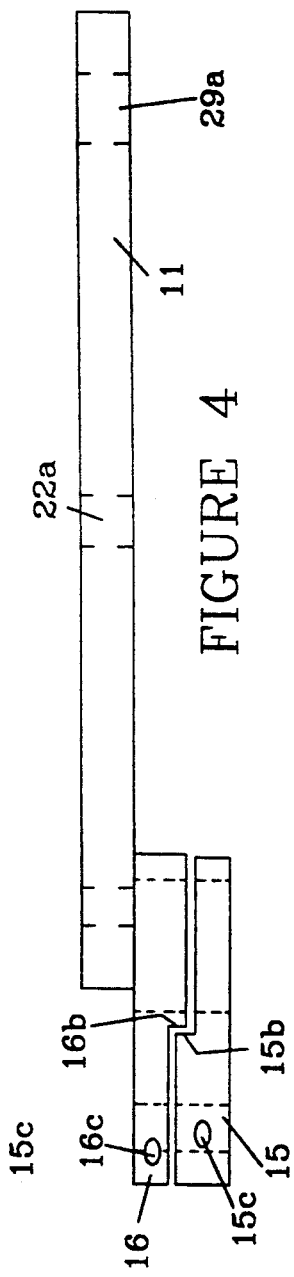
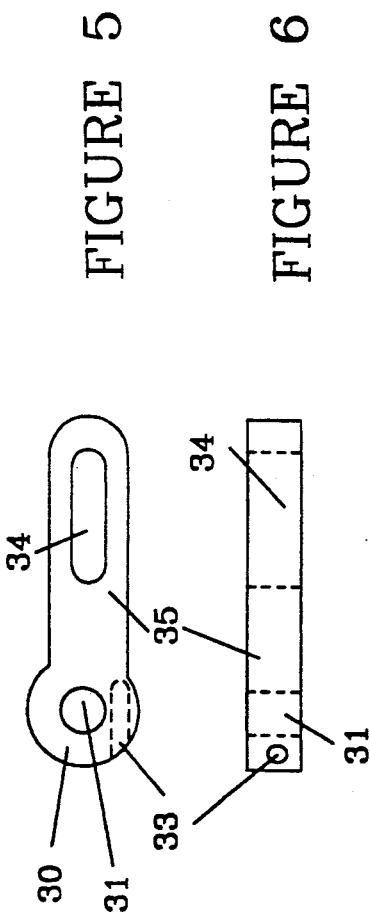
FIGURE 3
FIGURE 4
FIGURE 5
FIGURE 6

1

GLASS REPAIR APPARATUS

FIELD OF THE INVENTION

This invention relates to glass repair methods and apparatus and more particularly to an improved apparatus for repairing multiple chipped or cracked areas in automobile glass.

BACKGROUND OF THE INVENTION

The repair of small holes and cracks in glass, particularly automobile windshield glass is accomplished by filling the holes or cracks with a clear resin or epoxy type chemical to remove the air from the space created by the holes or cracks. When a stone or other object strikes a windshield, it generally produces a small surface chip. The repair chemical is usually an ultraviolet curable material. The majority of the damage is below the surface in the form of a cone-shaped piece of glass between the inter polybutyl layer and the outer layer of glass. Small amounts of air are trapped in the cracks. The air causes a refraction of the light passing through the glass. The object of glass repair is to remove the trapped air and fill the void with a clear material to stop the refraction of light and to stop the spread of the break.

Basic repair is accomplished by placing a bridge device on the windshield. On one end of the bridge is an injector which is centered over the break. The center of the bridge has a suction cup which holds the bridge in place. The other end of the bridge usually has an adjustable screw to press against the windshield and to rock and hold the injector against the windshield. Repair chemical is placed in the injector and then a screw is turned down slowly to force the chemical into the break. Care must be taken as excessive force of the chemical will cause any crack in the glass to creep or cause a flowering effect in the break, extending cracks across the windshield.

BRIEF SUMMARY OF THE INVENTION

The invention is to an improved apparatus and method for repairing glass holes and cracks in automotive windshields. The apparatus is an elongated bridge with a centrally located suction cup. On one end is an adjustable member that is contoured or constructed to adjust to the curvature of a windshield. On the other end of the bridge is at least two injectors for applying chemical to the holes and cracks in the windshield. Each injector has a heating element around or adjacent to an injection nozzle. Power to the heating element may be either by portable battery or may be connected to the automobile battery by clips, or by plugging it into a cigarette lighter.

Attached to the top of each injector is a plunger mechanism that is attached to the injector after chemical has been placed in the injector. The plunger mechanism may be of a type to screw into the injector or of a type to snap lock onto the top of the injector by a twist lock. The plunger may be spring loaded and may be pushed downward to apply the desired degree of pressure to the chemical, and then turned to place the plunger handle into a lock slot to hold the plunger in place, and maintain pressure on the chemical.

The improved method for repairing breaks in automobile glass that has two breaks or holes close together, which may or may not be connected by a crack, includes the steps of placing the injection fixture onto the windshield and securing it there with the suction cup. The fixture is then adjusted with a contour adjustable mechanism to firmly press a nozzle end over each of the breaks or chips to adjust the fixture to the curvature of the windshield. Current is applied to the nozzle heating element to heat the chemical therein. Chemical is then applied to the nozzles such that chemical fills the cracks or holes, and if there is a crack between the holes, then chemical is applied such that the chemical applied to one of the chips does not flow out the other chip.

Concurrently, with applying heat to the chemical in the injector, heat may be applied to the surface of the windshield to prevent any coolness of the windshield from slowing the flow of chemical and to cause the glass to expand, helping to seal the crack in the glass and to prevent further cracking of the glass.

Pressure is applied to the chemical to force it into the hole or crack. Each plunger maintains pressure on the chemical until it begins to set by exposure to ultraviolet light. In the event there is an air bubble in the chemical, the plunger may be slowly released to create a vacuum in the nozzle to draw the air bubble out of the break and/or chemical. When the air bubble is removed, pressure than may be reapplied to the chemical. One of the plungers may be temporarily backed away from the hole to allow chemical to flow through the crack between the holes and to allow air to be forced out of the crack.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 3 is a top view of the bridge element of the glass repair fixture;

FIG. 4 is a side view of a the bridge element;

FIG. 5 is a top view of an injector mount.

FIG. 6 is a side view of an injector mount

DESCRIPTION OF A PREFERRED EMBODIMENT

Figure 1:
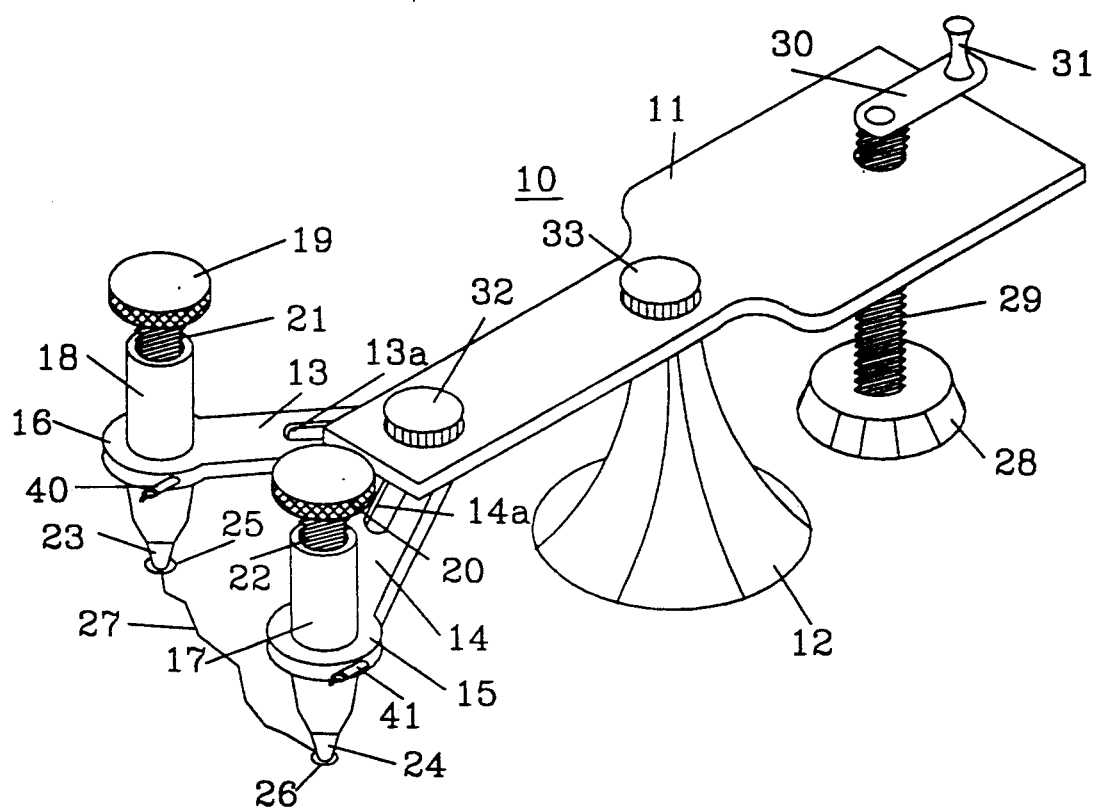
FIG. 1 is an isometric view of a glass repair fixture according to the present invention.

FIG. 1 illustrates a glass repair bridge 10 of the present invention having two chemical injectors mounted thereon. Bridge element 11 is mounted on a suction base 12 by screw 33. Two injector mounts 13 and 14 are secured to one end of bridge element 11 by screw 32. The injector mounts are adjustable such that they may be positioned in an arc around the end of the bridge element 11 and may be positioned at varying distances from the end of the bridge element by slots 13a, in mount 13, and slot 14a in mount 14. Each mount, 13 and 14, has a chemical injector 18 and 17 respectively, mounted thereon.

End 16 of mount 13 has a heating element 40 mounted thereon. End 15 of mount 14 has a heating element 41 mounted thereon. These heating elements are used to heat the repair chemical in the injector prior to injecting the chemical into a hole or crack in the glass to be repaired.

Bridge 10 has an adjustable positioning mechanism on the end opposite the injector end made up of base or foot 28 that is positioned up or down by screw 29 when turned by arm 30 and handle 31. The end of the bridge element is raised or lowered to position the injector end at a desired height over the glass and to hold the injectors against the glass.

In FIG. 1, a glass crack 27 has chips or holes 25 and 26 on each end. Injector tip 24 is positioned over hole 26 and injector tip 23 is positioned over hole 25. In practice, the tip would completely cover the hole to provide proper injection of repair chemical, and to hold the repair chemical in the hole, but in FIG. 1, the holes are shown slightly larger than the injector tip for purposes of illustration.

In use, heated repair chemical is injected into the hole in the glass by forcing the chemical through the injector by screw 21 and knob 19 on injector 18, and by screw 22 and knob 20 on injector 17. As chemical is being injected into the holes, one injector may be temporarily removed to allow chemical to completely flow through crack 27, and to ensure that there is no air bubble in the repair chemical. The temporarily removed injector is moved into place to prevent chemical from flowing out of the hole because of pressure from the other injector.

Figure 2:
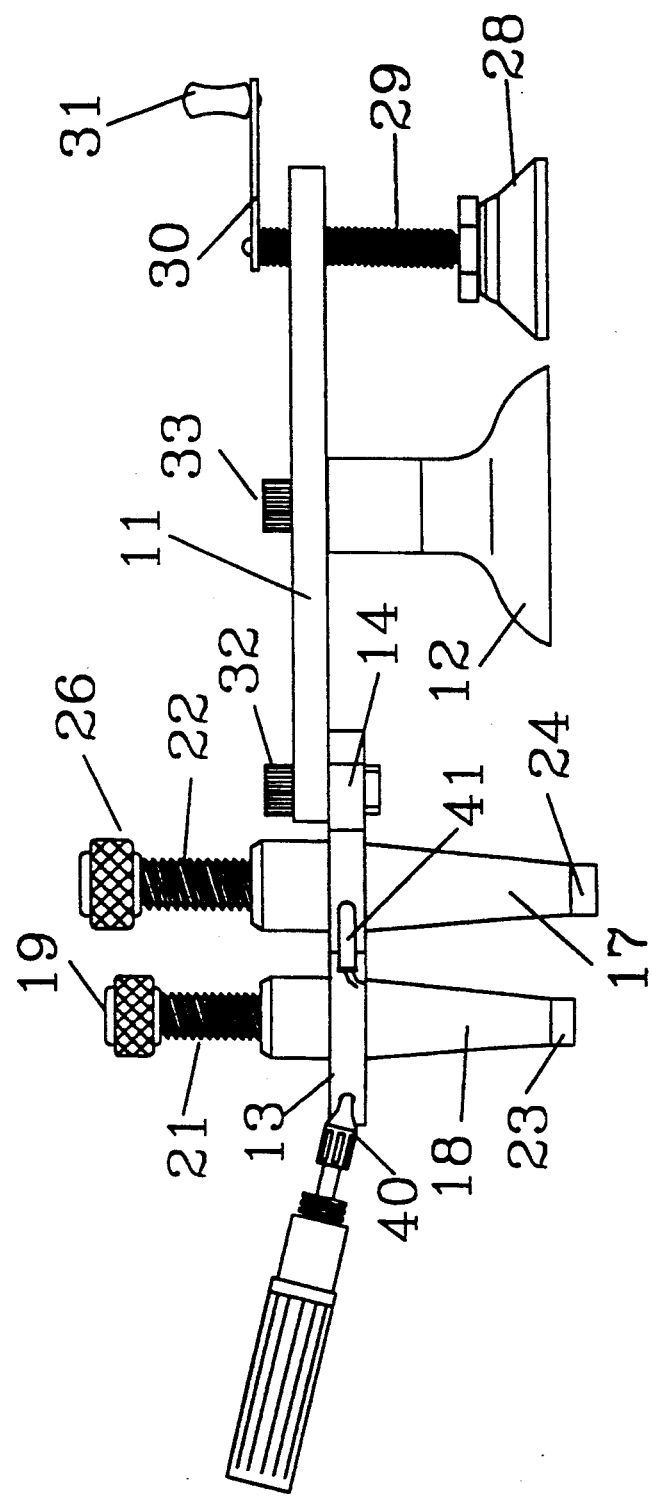
FIG. 2 is a side view of the fixture illustrated in FIG. 1.

FIG. 2 is a side view of the two injector glass repair bridge. The two bridge mounts 13 and 14 are mounted to the end of bridge element 11 by screw 32. The heating elements 40 and 41 are mounted in the side of the mount 13 and 14, respectively. Heating element 40 is, for example a propane solder tool. Heater 41 is, for example, an electrical heating element. If electrical power is not available, then one or two of the propane heaters may be used to heat the repair chemical.

The center of the bridge is supported on the glass surface by suction cup 12 secured to bridge element 11 by screw 33. The end of bridge element 11 opposite the injector end is supported by base 28 connected to the end of the bridge element 11 by screw 29. The end of the bridge element is positioned up or down by turning screw 29 by arm 30 and knob 31.

FIG. 3 illustrates a top view of the bridge element 11 and the injector mounts 13 and 14. Bridge element 11 has a reduced injector mount end and has a hole 32a through which screw 32 (FIGS. 1 and 2) is placed to secured the mounts 13 and 14 to the bridge element end. Injector mount 13 has a slot 13a and injector mount 14 has a slot 14a through which screw 32 is placed to secure the injector mounts to the injector end of bridge element 11. Slots 13a and 14a permit the injector mounts to be positioned at different positions in respect to the end bridge element 11, and to be moved in an arc around the end of bridge element 11. This two degree of freedom of movement permits each injector mounted in its respective injector mount to be positioned independent of the other injector.

Each injector end has a hole therein for mounting a heating element. Injector mount 13 has a heat element mounting hole 16c in injector mount end 16. Injector mount 14 has a heat element mounting hole 15c in injector mount end 15. The close proximity of injector mount hole 16a to heating element mount hole 16c permits heat from the heating element to heat the repair chemical in the injector mounted in hole 16a. This is true also for heating the chemical in the injector mounted in injector mounting hole 15a in injector mount 14.

FIG. 4 is a side view of the bridge element 11 and injector mounts 13 and 14 illustrated in FIG. 3. It should be noted that in this FIG. 4, the injector mounts are nested to gather at 15b and 16b to provide a smaller profile for the two injector mounts. The heater mounting holes 15c and 16c are also illustrated in FIG. 4.

FIGS. 5 and 6 illustrate another embodiment of the injector mounts. In this embodiment, the injector mount is not stepped as illustrated at 15b and 16b of FIG. 4. Injector mount 35 has a slot 34 for securing mount 35 to the bridge element and to permit the two dimensional positioning of mount 35. Mount 35 has an injector mount end 30 which has injector mounting hole 31 and heating element mounting hole 33.

What is claimed:

1. An apparatus for repairing cracks and chips in automobile windshields comprising;
    a bridge for mounting on the windshield surface;
    at least two slotted injector mount arms pivotally mounted on a first end of the bridge, one of said at least two slotted arms mounted over another of said at least two slotted arms;
    at least two injectors, each injector mounted on each of the at least two injector mount arms for injecting repair chemical into the windshield crack;
    a single securing device for holding said at least two slotted injector mount arms;
    one heating element mounted on each of the at least two injector mounting arms for heating the repair chemical prior to injecting it into the crack; and
    a stabilizer attached to a second end of the bridge for ensuring that the bridge adjusts to the contour of the windshield, and to position the injectors against the crack in the windshield;
    wherein the slotted arms are movable linearly and pivotally about the single securing device to place an injector over each end of a crack in a windshield, and to enable movement of an injector along the crack.

2. The injector according to claim 1, wherein the injector has an adjustable plunger for moving repair chemical into the crack and maintaining pressure on the repair chemical for a desired period.

3. The apparatus according to claim 1, wherein the heating elements are propane heating elements.

4. The apparatus according to claim 1, wherein the heating elements are electrically powered.

* * * * *